United States Patent [19]

Takagi

[11] Patent Number: 5,430,343
[45] Date of Patent: Jul. 4, 1995

[54] DRIVE CIRCUIT FOR AN ULTRASONIC MOTOR

[75] Inventor: Tadao Takagi, Yokohama, Japan

[73] Assignee: Nikon Corporation, Tokyo, Japan

[21] Appl. No.: 135,468

[22] Filed: Oct. 13, 1993

[30] Foreign Application Priority Data

Oct. 14, 1992 [JP] Japan ................... 4-275624

[51] Int. Cl.[6] .......................................... H01L 41/08
[52] U.S. Cl. ...................................... 310/316; 310/323
[58] Field of Search .......... 310/323, 316, 319; 318/116

[56] References Cited

U.S. PATENT DOCUMENTS

| | | | |
|---|---|---|---|
| 4,658,172 | 4/1987 | Izukawa | 310/316 |
| 4,692,649 | 9/1987 | Izukawa et al. | 310/316 |
| 4,954,742 | 9/1990 | Izukawa | 310/316 |
| 5,001,404 | 3/1991 | Kataoka | 318/116 |
| 5,134,333 | 7/1992 | Atsuta | 310/323 |
| 5,198,714 | 3/1993 | Salomon et al. | 310/323 |

FOREIGN PATENT DOCUMENTS 62-203575 9/1987 Japan .

Primary Examiner—Mark O. Budd
Attorney, Agent, or Firm—Oliff & Berridge

[57] ABSTRACT

An ultrasonic motor includes a piezoelectric element provided with drive electrodes and also with detector electrodes, an elastic body, and a rotor assembly. A drive circuit for this ultrasonic motor includes a high frequency signal generator, a phase shifter, amplifiers which supply high frequency AC voltage to the drive electrodes, and a CPU. The CPU measures the voltages from a pair of electrodes and calculates the difference of their mean square values, and similarly measures the voltages from the other pair of electrodes and calculates the difference of their mean square values. In this way, the CPU detects the presence of any standing wave component in the vibrations which are being excited in the elastic body by the piezoelectric element. The CPU varies the amplification ratios provided by the amplifiers according to the result of this standing wave detection process, and thereby alters the amplitudes of the voltages supplied to the drive electrodes. By repeatedly performing this calculation and adjustment process, the CPU can reduce the standing wave component effectively to zero, thus increasing the drive efficiency of the ultrasonic motor.

11 Claims, 11 Drawing Sheets

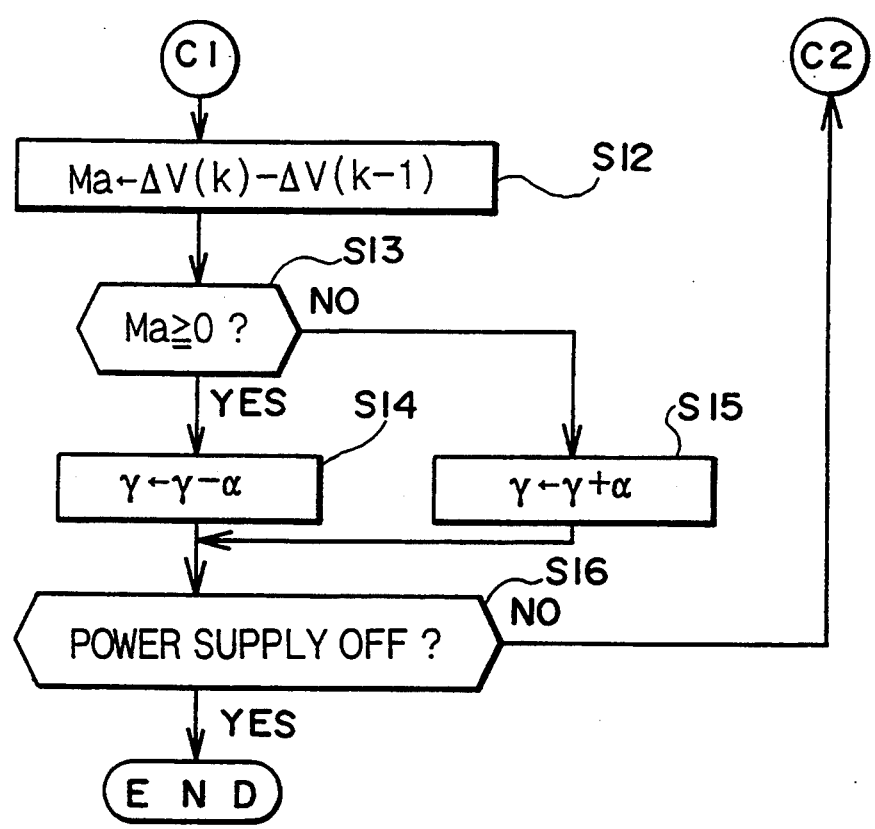

DRIVE CIRCUIT FOR AN ULTRASONIC MOTOR

BACKGROUND OF THE INVENTION

1. Field of the Invention

The present invention relates to a drive circuit for an ultrasonic motor which employs ultrasonic vibrations.

2. Related Background Art

Ultrasonic motors which employ ultrasonic vibrations are nowadays becoming widely used in many fields, due to their possession of various desirable characteristics such as high torque, capability for being made compact, low electrical consumption, etc.

FIG. 1 is a perspective view of an ultrasonic motor. Referring to this figure, the reference numeral 1 denotes an elastic body, on the lower surface in the figure of which there is fixed a piezoelectric element 2. As shown in FIG. 2, the piezoelectric element 2 is formed with a plurality of segments which are arranged around it in circumferential sequence with a pitch equal to half the wavelength λ of a traveling wave which is to be set up, and the polarity of neighboring segments is opposite. In FIG. 2, the segments labeled with the symbol "X" (for example the segment 2a) have a polarity perpendicular to the plane of the drawing paper in the direction away from the viewer, and the segments labeled with the symbol "." (for example the segment 2b) have the opposite polarity (towards the viewer).

Further, as shown in FIG. 3, an electrode 2d and an electrode 2f are provided on the under surface of the piezoelectric element 2. Each of the electrodes 2d and 2f are formed by painting an electroconductive paint over eleven neighboring ones of the segments of the piezoelectric element 2. A first high frequency AC voltage is supplied to the electrode 2d via a reed wire 2e, and a second high frequency AC voltage is supplied to the electrode 2f via a reed wire 2g. In the following description, the groups of segments of the piezoelectric element 2 to which the first and the second high frequency AC voltages are supplied will respectively be collectively termed the A group and the B group as shown in FIG. 3.

When high frequency AC voltage is supplied to each of the electrodes 2d and 2f of the piezoelectric element 2 shown in FIG. 3, the piezoelectric element 2 is excited to vibrate, and generates traveling waves in the surface of the elastic body 1 which is grounded as shown in FIG. 1. The elastic body 1 and the piezoelectric element 2 together constitute a stator assembly ST.

Referring to FIG. 1, the reference numeral 3 denotes a rotor member, to the lower surface of which in FIG. 3 there is fixed or bonded a slider member 4 which is made of resin or the like. Since this rotor member 3 is kept pressed against the stator assembly ST by a pressure application means not shown in the figures, the rotor member 3 and the slider member 4 are rotated together when traveling waves are generated in the elastic body 1 as described above. The rotor member 3 and the slider member 4 together constitute a rotor assembly RO.

FIGS. 4A through 4D are figures for explanation of the theory of how the traveling waves are generated in the elastic body 1. Although as shown in FIG. 2 the piezoelectric element 2 is actually formed in a ring shape, in FIG. 4A the piezoelectric element 2 is shown as extended along a straight line for the convenience of explanation. FIGS. 4B through 4D show the basics of the generation of transverse vibrations in the elastic body 1 when mutually differing high frequency AC voltages are supplied to the A group of electrodes and to the B group of electrodes.

The horizontal axes of the waveforms displayed in FIGS. 4B through 4D show segment position, i.e. angular position along the piezoelectric element 2 around the central axis of the ultrasonic motor, while the vertical axes show the magnitude of the transverse displacement of the corresponding point on the elastic body 1, i.e. its vibrational amplitude. Further, the left portions of FIGS. 4B through 4D symbolically show (in vector form) the two sine wave voltage waveforms V1 and V2 which are being supplied to the A group of electrodes and to the B group of electrodes respectively, and the projections onto the horizontal axis of the conceptual rotating voltage vectors V1 and V2 show the actual voltage values at various time points of these voltages, with positive electrical potential being shown by a projection which extends rightwards and negative electrical potential being shown by a projection which extends leftwards. In FIGS. 4A through 4D, it is shown that the phase difference in time between the first high frequency AC voltage V1 which is being applied to the A group of electrodes and the second high frequency AC voltage V2 which is being applied to the B group of electrodes is maintained at ρ/2. Further, since as shown in FIG. 2 there is provided an empty segment in the space between the A group of electrodes and the B group of electrodes having width (circumferential extent) λ/4, therefore there is a phase difference in space between V1 and V2 of λ/4.

FIG. 4B shows the waveform of the transverse displacement of the elastic body 1 when the first high frequency AC voltage V1 is being applied to the A group of electrodes while no voltage is being supplied to the B group of electrodes; while FIG. 4D shows the opposite case, i.e. shows the waveform of the transverse displacement of the elastic body 1 when the second high frequency AC voltage V2 is being applied to the B group of electrodes while no voltage is being supplied to the A group of electrodes. If high frequency AC voltage were supplied either only to the A group of electrodes or only to the B group of electrodes, then the corresponding waveform shown in FIG. 4B or FIG. 4D would be a standing wave, and no traveling waves would be generated in the elastic body 1.

However, FIG. 4C shows the waveform of the transverse displacement of the elastic body 1 when the first and the second high frequency AC voltages V1 and V2 are being applied to the A and B groups of electrodes, respectively. In this figure, the hypothetical waveform Z1 shown by a dashed line represents the waveform of the transverse standing wave displacement of the elastic body 1 which would be generated by the application of only the first high frequency AC voltage V1 at its current amplitude to only the A group of electrodes, i.e. is a reduced version of the FIG. 4B waveform; and similarly the hypothetical waveform Z2 also shown by a dashed line represents the waveform of the transverse standing wave displacement of the elastic body 1 which would be generated by the application of only the second high frequency AC voltage V2 at its current amplitude to only the B group of electrodes, i.e. is a similarly reduced version of the FIG. 4D waveform. And the combination of these two waveforms Z1 and Z2 results in the combined waveform Z shown by the solid line, which is the waveform of a traveling wave which is progressing along the elastic body 1 in the rightwards direction in the figure. This traveling wave in the elastic body 1 thus is generated by the application of the high frequency AC voltages V1 and V2 to the A group of electrodes and to the B group of electrodes respectively, these voltages V1 and V2 having a phase difference in time of $p/2$ and a phase difference in space of $\lambda/4$. The rotor assembly RO is rotated by this traveling wave, since characteristic resonant vibrations are also set up in the stator assembly ST. In the prior art control was performed so as to ensure that the frequency of the high frequency AC voltage which was being applied to the piezoelectric element 2 agreed with the resonant frequency of the stator assembly ST.

However, since the resonant frequencies can change according to change in the load on the motor and the like, drive circuits for ultrasonic motors have been proposed which can drive the motor at high efficiency and stably even when the resonant frequencies change.

For example, with a drive circuit of the type disclosed in Japanese Patent Laid-Open Publication No. 62-203575, the frequency of the high frequency AC voltage applied to the piezoelectric element 2 is changed according to the value of a monitor voltage generated by a monitor electrode $2c$ provided on the piezoelectric element 2, and thereby the rotor assembly is rotated steadily and reliably.

FIG. 5 is a block diagram of this type of prior art drive circuit for an ultrasonic motor. Referring to this figure, the reference numeral 11 denotes a high frequency signal generator which generates the high frequency AC voltage which is applied to the piezoelectric element 2, and 12 is an amplifier which amplifies this high frequency AC voltage from the high frequency signal generator 11, 13 is a phase shifter which shifts the phase of the high frequency AC voltage generated by the high frequency signal generator 11 by exactly $p/2$, and 14 is another amplifier which amplifies the high frequency AC voltage from the phase shifter 13. The high frequency AC voltages amplified by the amplifiers 12 and 14 are respectively fed to the electrodes $2d$ and $2f$ of the piezoelectric element 2.

The reference numeral 15 denotes a voltage detection section which detects the monitor voltage which is generated by the electrode $2c$ of the piezoelectric element 2. Since this monitor voltage changes according to the amplitude of vibration of the stator assembly ST, the voltage detection section 15 can measure the value of the amplitude of vibration of the stator assembly ST by detecting the value of this monitor voltage.

The reference numeral 16 denotes a voltage setting section for setting the value of the voltage as required for rotating the rotor assembly RO at the desired rotational speed, while 17 is a comparison section which compares the monitor voltage detected by the voltage detection section 15 with the reference voltage set by the voltage setting section 16. 18 denotes a frequency determination section which selects a desired frequency according to the comparison result produced by the comparison section 17. When it is decided by the comparison section 17 that the monitor voltage is lower than the reference voltage, then the frequency determination section 18 selects a relatively low frequency; while, when the monitor voltage is higher than the reference voltage, then the frequency determination section 18 selects a relatively higher frequency. The frequency selected by the frequency determination section 18 is input to the high frequency signal generator 11, whereby a high frequency AC voltage of this frequency is applied to the electrodes $2d$ and $2f$ of the piezoelectric element 2. By performing this sort of feedback control, it is possible to keep the rotor assembly RO rotating at the desired rotational speed in a stable manner.

However, with this type of drive circuit for an ultrasonic motor, when the high frequency AC voltage is applied to the piezoelectric element 2, the resonant frequency and vibrational amplitude inevitably deviate from their expected values, due to the inevitable influences of the manufacturing tolerances for the dimensions of the elastic body 1, for the dimensions of the various segments of the piezoelectric element 2, for the polarities of the various segments of the piezoelectric element 2, and for the thickness of the adhesive layer between the elastic body 1 and the piezoelectric element 2; in the following discussion, all these inaccuracies will be referred to collectively as manufacturing errors of the stator assembly ST.

FIG. 6 is a graph showing along the horizontal axis the frequency of the high frequency AC voltage which is being applied to the piezoelectric element 2, and along the vertical axis the amplitude of vibration of the stator assembly ST. The resonant vibration curve 21 in the figure is for the case when high frequency AC voltage is applied only to the A group of electrodes of the piezoelectric element 2, while the resonant vibration curve 22 is for the case when high frequency AC voltage is applied only to the B group of electrodes; and the resonant frequencies for these curves are designated as fA and fB respectively. When manufacturing errors occur in the production of the stator assembly ST, even if the frequencies and the amplitudes of the high frequency AC voltages applied to the A group of electrodes and to the B group of electrodes are the same, as show in the figure, deviation will occur in the resonant frequencies or amplitudes of the stator assembly ST. Accordingly, deviation occurs in the amplitude of the standing waves due to the A group of electrodes and in the amplitude of the standing waves due to the B group of electrodes, and, when these standing waves are combined in the elastic body 1, the resultant wave not only consists of the desired traveling wave component, but also includes a residual standing wave component which is very undesirable. Not only does this standing wave component not contribute in any manner to the rotation of the rotor assembly RO, but it is also actually a primary cause of deterioration in the efficiency of rotation of the rotor assembly RO. However, with a prior art type of drive circuit for an ultrasonic motor like the one shown in FIG. 5, the method of control does not take any account of the generation of this undesirable standing wave component.

SUMMARY OF THE INVENTION

The objective of the present invention is to provide a drive circuit for an ultrasonic motor which increases the efficiency of driving for the ultrasonic motor.

In order to attain this objective, the present invention in a preferred embodiment includes a drive circuit for an ultrasonic motor having a piezoelectric element, an elastic body within which a traveling wave is generated by vibration of the piezoelectric element, and a movable member which is driven by the traveling wave; wherein a standing wave component generated in the elastic body is detected, and a high frequency AC voltage supplied to said piezoelectric element is controlled based upon the result of this detection.

Since the high frequency AC voltage supplied to the piezoelectric element is controlled based upon the detection of the standing wave component generated in the elastic body, it is possible to eliminate this standing wave component. By doing this, it is possible to enhance the drive efficiency of the ultrasonic motor.

Further, according to another aspect of the present invention, the above described objective is attained by a drive circuit for an ultrasonic motor having a piezoelectric element, an elastic body within which a traveling wave is generated by vibration of said piezoelectric element, and a movable member which is driven by said traveling wave, comprising a power supply which supplies a first high frequency AC voltage and a second high frequency AC voltage to said piezoelectric element, a standing wave component detecting device for detecting the standing wave component generated in said elastic body, and a control device which control is said power supply so as to adjust the balance between said first high frequency AC voltage and said second high frequency AC voltage, based upon the detection of said standing wave component by said standing wave component detecting device.

The balance between the first high frequency AC voltage and the second high frequency AC voltage is adjusted by the control device based upon the detection of the standing wave component generated in the elastic body, and these adjusted first and second high frequency AC voltages are supplied to the piezoelectric element by the power supply. By doing this, even if a standing wave component is present in the vibrations which are excited in the elastic body by the piezoelectric element, it is possible effectively to annihilate this standing wave component by altering the first and second high frequency AC voltages which are supplied to the piezoelectric element, and thereby it is possible to enhance the drive efficiency of the ultrasonic motor.

And moreover, according to another aspect of the present invention, the above described objective is attained by a drive circuit for an ultrasonic motor having a piezoelectric element, an elastic body within which a traveling wave is generated by vibration of said piezoelectric element and a movable member which is driven by said traveling wave wherein a plurality of vibration detection elements which is provided in said elastic body, and the ultrasonic motor is controlled based upon the output of vibration detection elements.

The standing wave component which is generated in the elastic body is detected according to the output of a plurality of vibration detection elements, and by controlling driving for the ultrasonic motor so as to annihilate this standing wave component, it is possible to enhance the drive efficiency of the ultrasonic motor.

BRIEF DESCRIPTION OF THE DRAWINGS

FIG. 11 is a second portion of the FIG. 10 flow chart.

DETAILED DESCRIPTION OF THE PREFERRED EMBODIMENT

Figure 1:
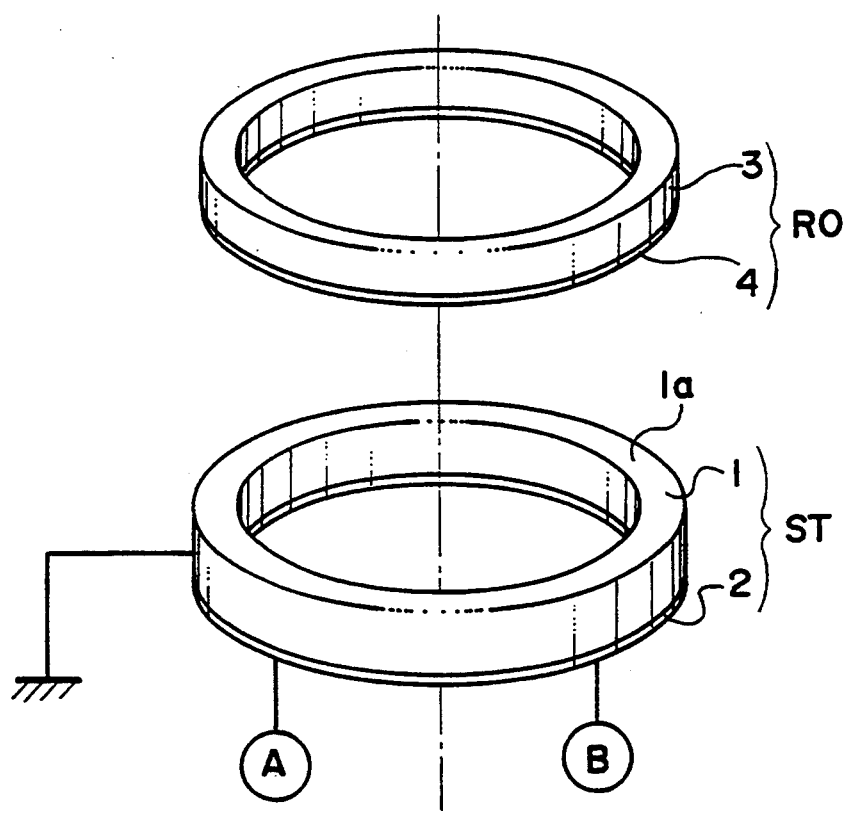
FIG. 1 is a perspective view showing the general construction of an ultrasonic motor.
Figure 2:
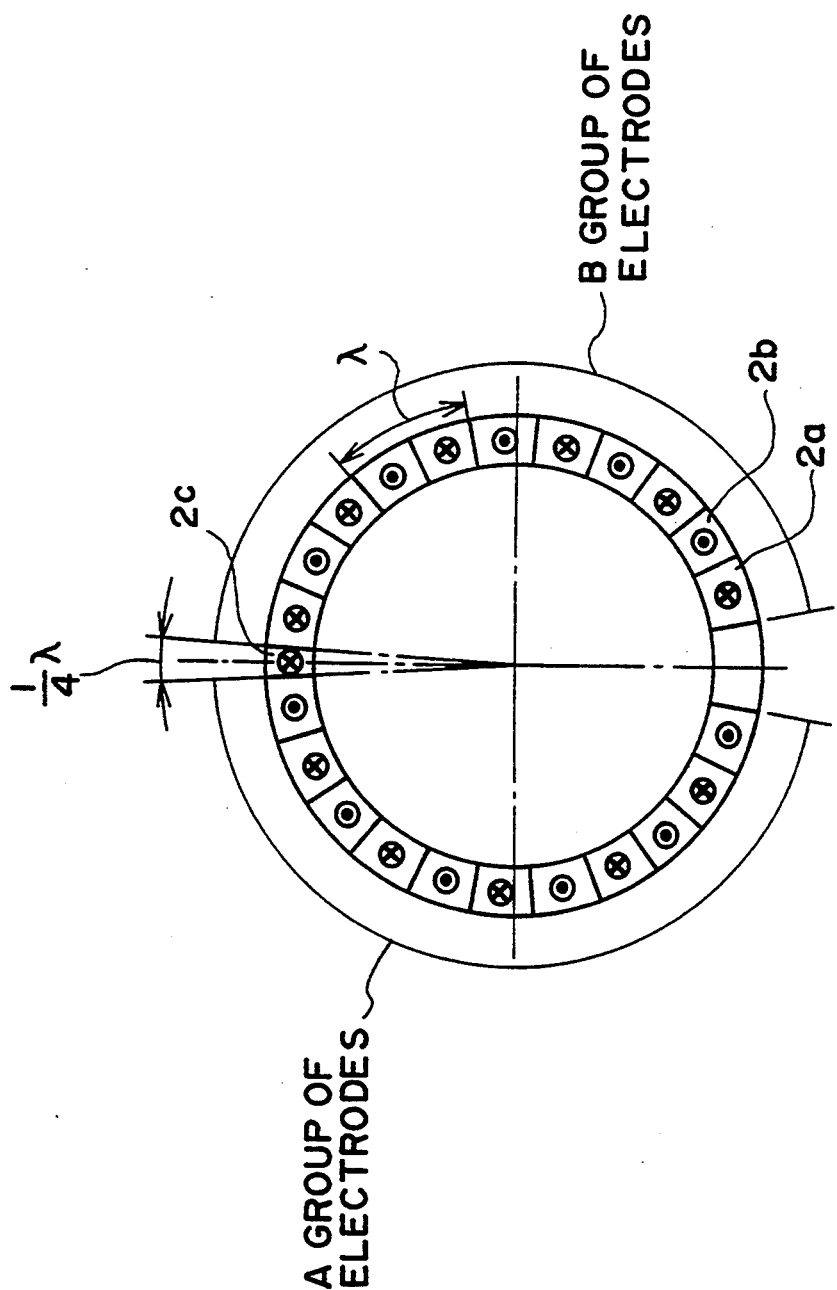
FIG. 2 is a figure showing the arrangement of various segments on the upper surface of a piezoelectric element included in the FIG. 1 ultrasonic motor.
Figure 3:
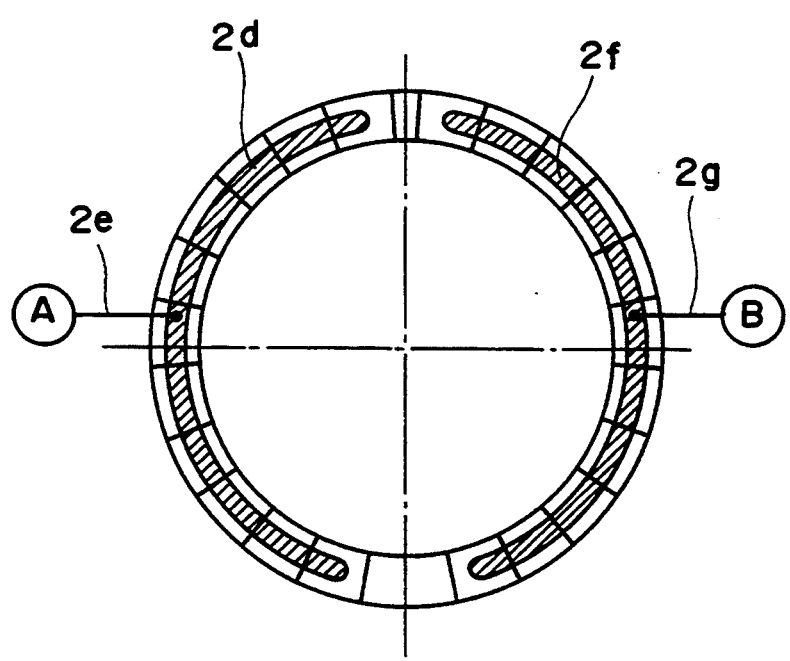
FIG. 3 is a figure showing the arrangement of various electrodes disposed on the under surface of the piezoelectric element of FIG. 2.
Figure 4:
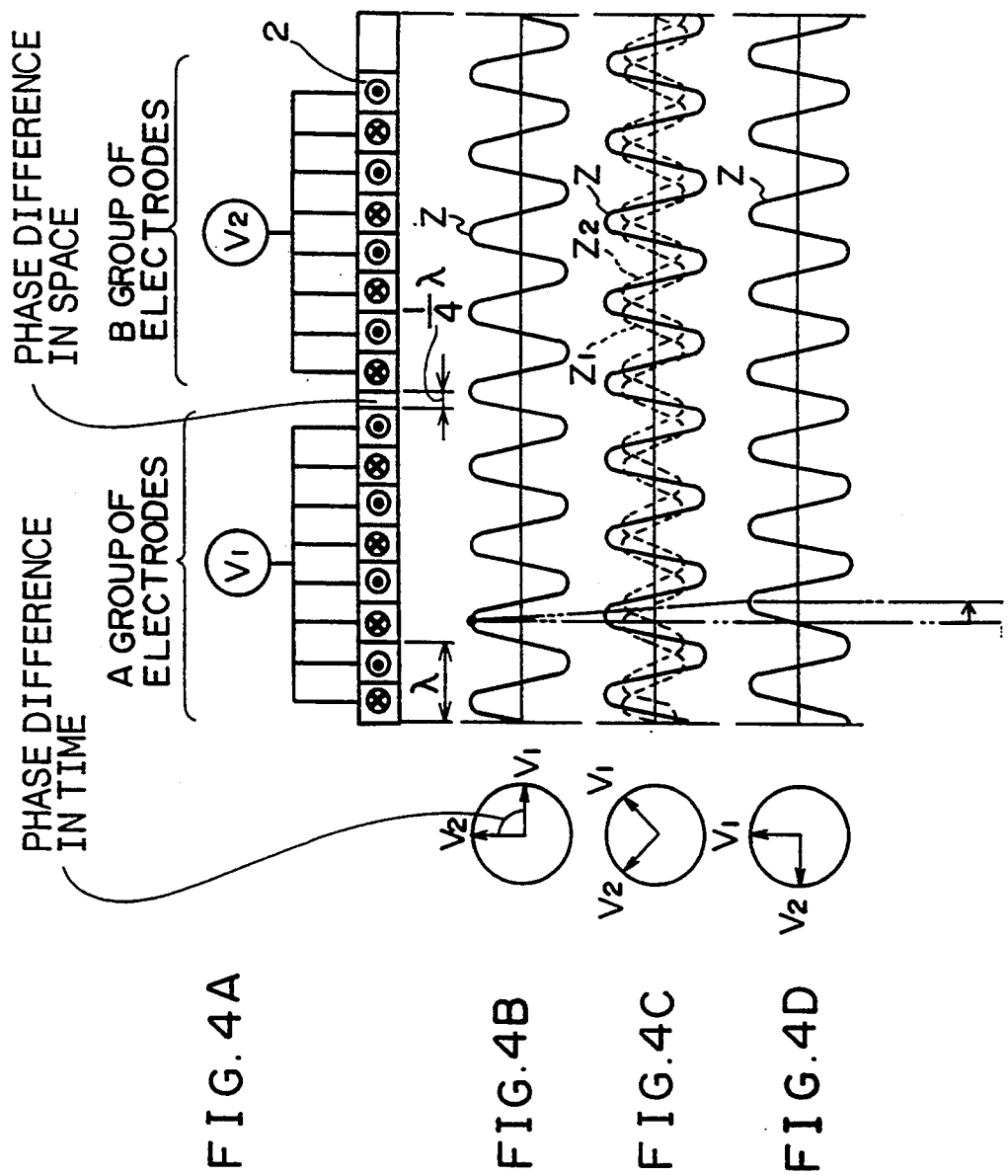
FIGS. 4A through 4D are figures for explaining the theory of the generation of traveling waves and standing waves in a stator assembly of the ultrasonic motor shown in FIG. 1.
Figure 5:
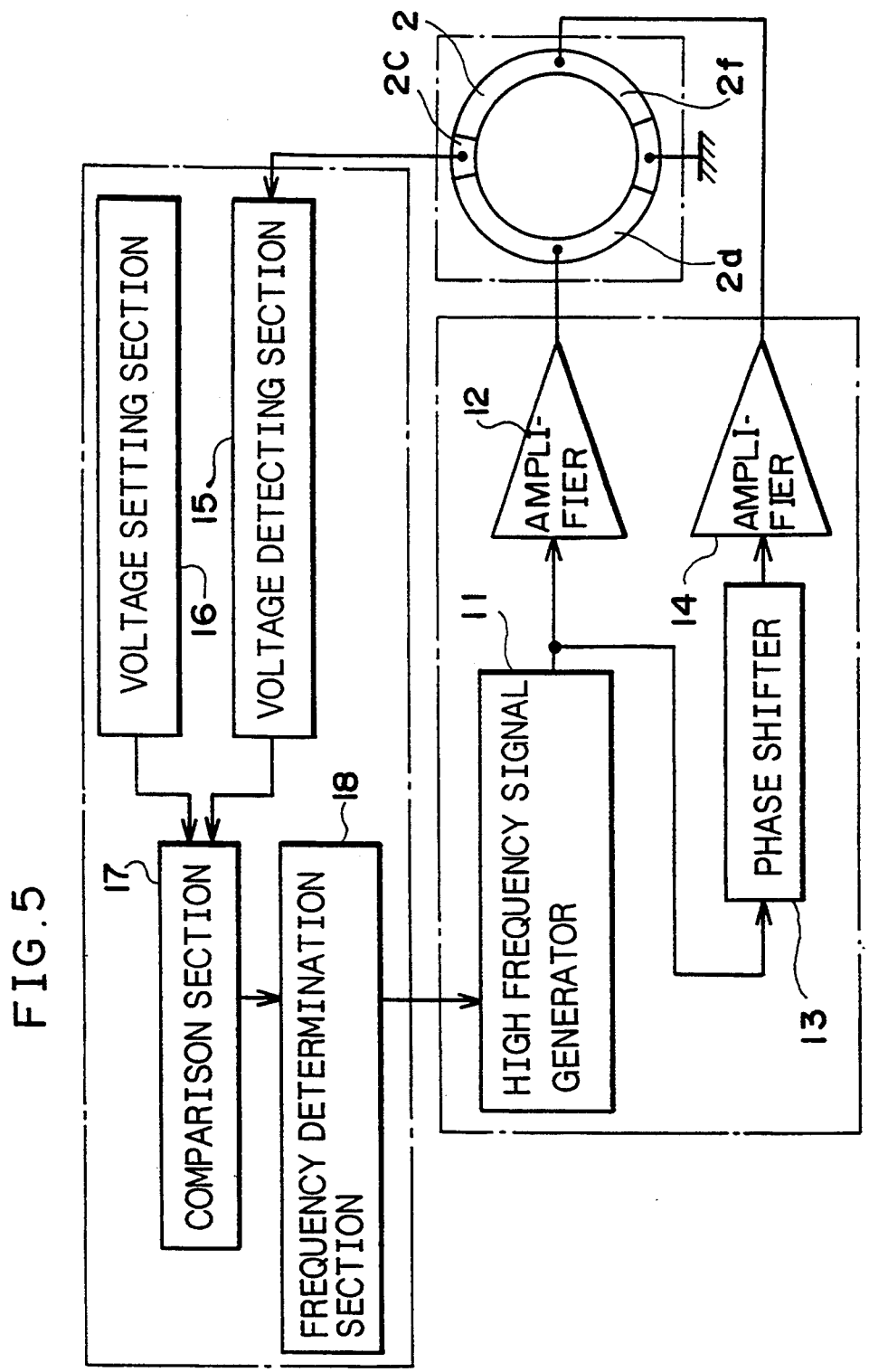
FIG. 5 is a block diagram showing the construction of a prior art drive circuit for an ultrasonic motor.
Figure 7:
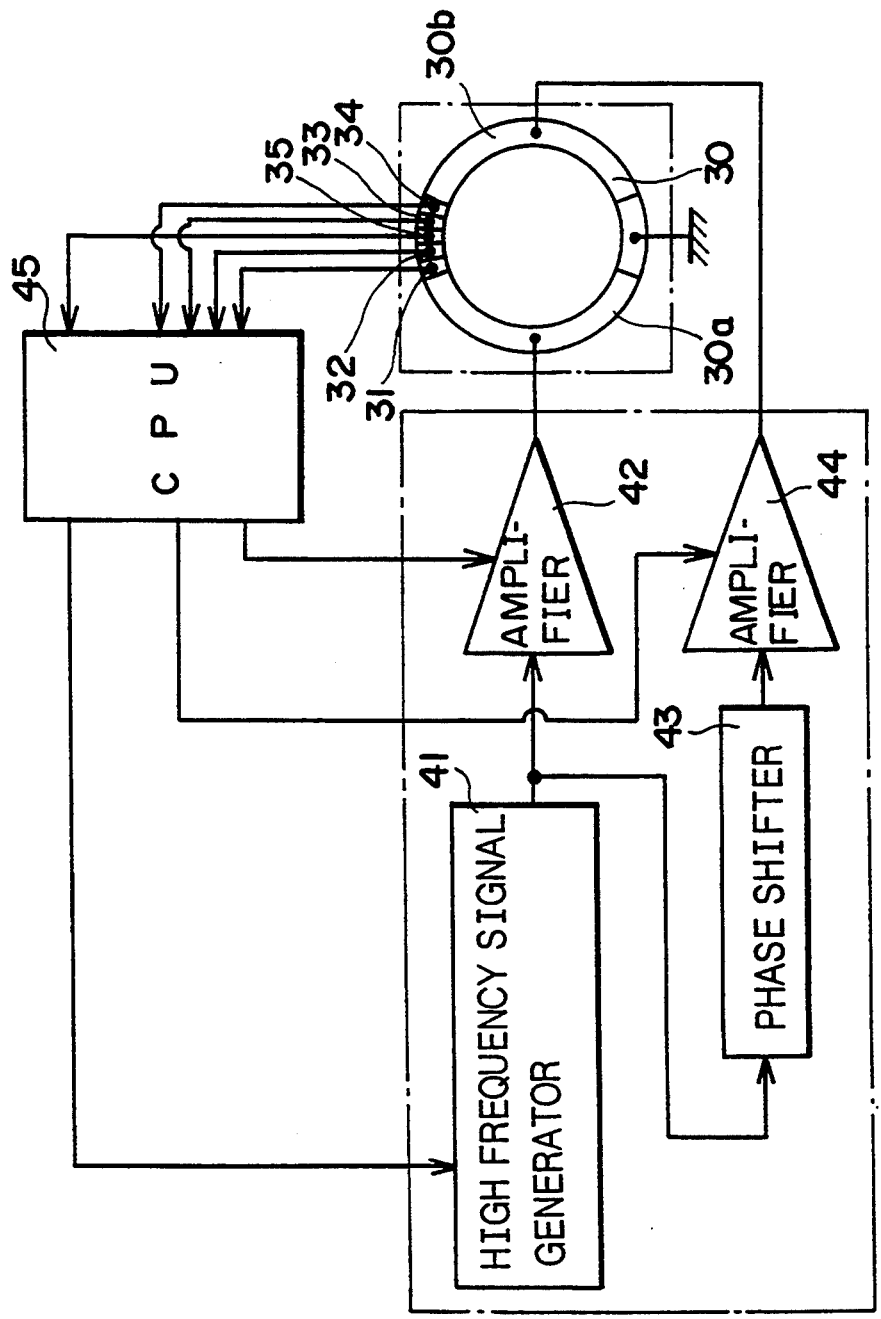
FIG. 7 is a block diagram, similar to FIG. 5, showing a preferred embodiment of the drive circuit for an ultrasonic motor of the present invention.

FIG. 7 is a block diagram showing a preferred embodiment of the drive circuit for an ultrasonic motor of the present invention. Referring to FIG. 7, the drive circuit comprises a high frequency signal generator 41 and a phase shifter 43 which are identical to those utilized in the prior art as shown in FIG. 5, and which accordingly will not be described in detail herein. The reference numeral 42 denotes an amplifier for the first high frequency AC voltage V1 which is to be supplied to the A group of electrodes, whose amplification ratio can be altered according to a command signal received from a CPU 45 which will be described hereinafter; and similarly the reference numeral 44 denotes an amplifier for the second high frequency AC voltage V2 which is to be supplied to the B group of electrodes, whose amplification ratio can be similarly altered according to a command signal received from the CPU 45.

The reference numeral 45 denotes a CPU which detects the standing wave component of the vibrations generated in the elastic body 1, and which performs control so as to eliminate this standing wave component, i.e. reducing it to zero. In order to detect this standing wave component, the CPU 45 detects the values of voltages from detector electrodes 31 through 34 which are shown in detail in FIG. 8, and which are provided on the under surface of the elastic body 1. In detail, these detector electrodes 31 through 34 are fitted in a gap in the circumferential direction of the stator assembly ST provided between the. A group of electrodes and the B group of electrodes, and a first pair 31 and 32 of the detector electrodes is arranged on one side of a further monitor electrode 35 which is provided for detecting the amplitude of the vibrations of the stator assembly ST, while a second pair 33 and 34 of the detector electrodes is arranged on the other side of the monitor electrode 35. FIG. 9C shows the portion of the stator assembly ST on which detector electrodes 31 through 34 are mounted, shown as extended along a straight line for the convenience of display, and, as shown in FIG. 9C, the interval in the circumferential direction between the detector electrodes 31 and 32 of the first pair thereof is λ/4 (where λ is the wavelength of the traveling waves in the stator assembly ST), and similarly the interval between the detector electrodes 33 and 34 of the second pair thereof is also λ/4. Further, the width in the circumferential direction of the gap between the first pair 31 and 32 and the second pair 33 and 34 of detector electrodes is also λ/4, so that the interval in the circumferential direction between the a center of first pair 31 and 32 of these detector electrodes (taken as a group) and a center of the second pair 33 and 34 thereof ( also taken as a group ) is 3×λ/4. In addition, the width of the segment on which the monitor electrode 35 is provided is λ/4.

In the following, description the control process performed by the CPU 45 in order to extract the standing wave component from the mixed vibrations of this standing wave component and a traveling wave component which are excited in the elastic body will be explained.

FIG. 9A shows the relationship between a segment position (on the horizontal axis) and the vibrating amplitude (on the vertical axis) of the traveling wave progressing through the elastic body 1, while FIG. 9B shows the relationship between a segment position (on the horizontal axis) and the vibrating amplitude (on the vertical axis) of the standing wave in the elastic body 1. Several waves are shown both in FIG. 9A and in FIG. 9B, and in FIG. 9A this indicates that the phase of the traveling wave changes with time as it travels along the elastic body 1, while in FIG. 9B this indicates that the amplitude of the standing wave changes with time as it oscillates in the same standing position.

Figure 8:
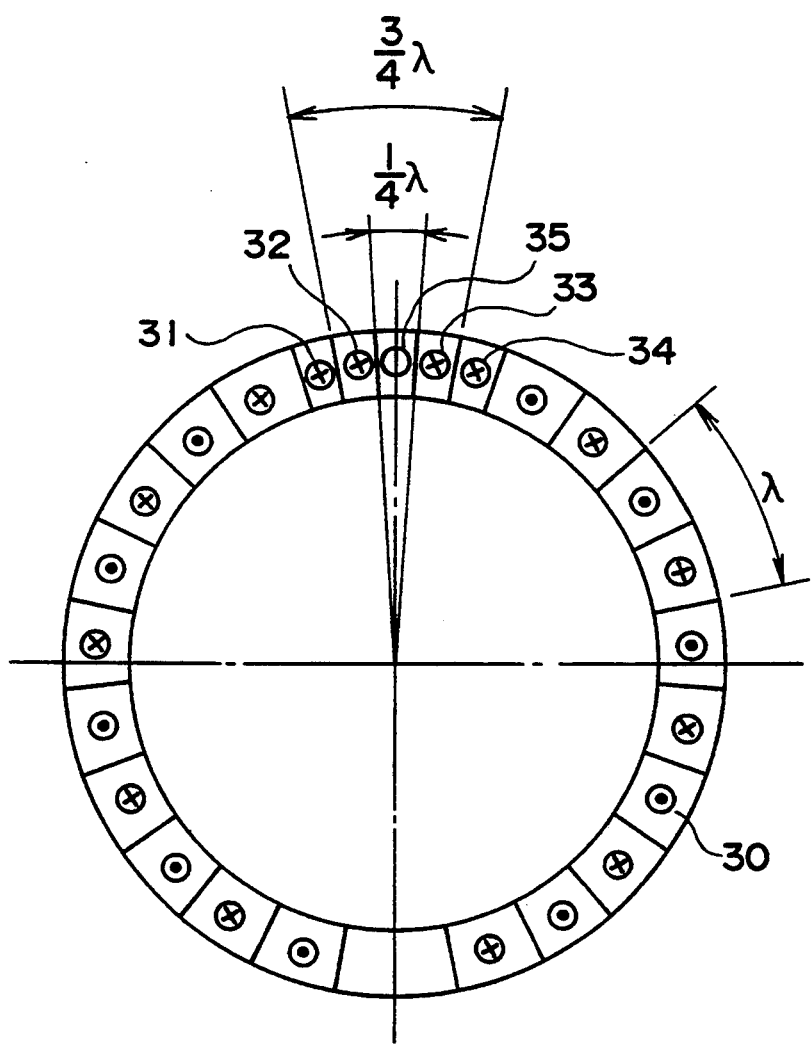
FIG. 8 shows the disposition of various electrodes which are provided on the under surface of the elastic body of this ultrasonic motor.
Figure 9:
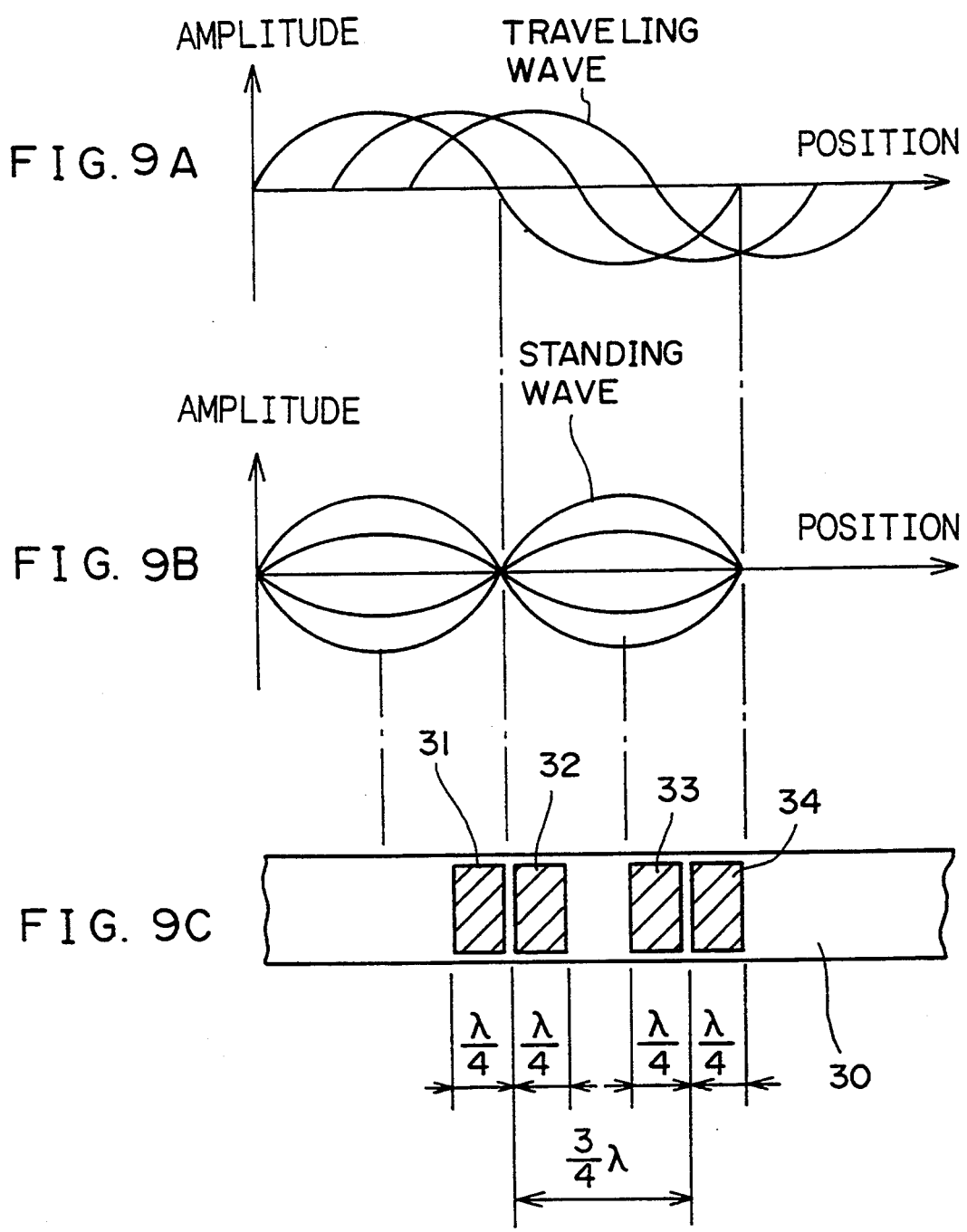
FIGS. 9A through 9C are figures for explanation of the theory of extraction of the standing wave component from the wave motion of the elastic body, which is a mixture of a traveling wave component and a standing wave component.

FIG. 9C is an enlarged view of a portion of the stator member ST shown in FIG. 8 (the monitor electrode 35 is omitted), and shows the arrangement of the electrodes 31 through 34. The positions in the horizontal direction in this figure of the electrodes correspond to position along the horizontal axis in FIG. 9A and in FIG. 9B. From FIGS. 9B and 9C it appears that a node of the standing wave is present between the electrodes 31 and 32 (but not between the detector electrodes 33 and 34), but this is only a feature of the individual stator assembly ST of the shown example. Of course the nodes of the standing wave could establish themselves at any series of positions around the stator assembly ST, and their actual positions are determined in practice according to manufacturing errors which inevitably occur in the production of the particular stator assembly ST.

In the following description the mean square values of the voltages detected by the detector electrodes 31 and 32 will be termed Vpp(1) and Vpp(2) respectively, and the difference between them will be termed ΔV1. Similarly, the mean square values of the voltages detected by the detector electrodes 33 and 34 will be termed Vpp(3) and Vpp(4) respectively, and the difference between them will be termed ΔV2. When the traveling wave shown in FIG. 9A is generated in the elastic body 1, the mean square values of the voltages Vpp(1) and Vpp(2) respectively detected by the detector electrodes 31 and 32 are equal and accordingly their difference ΔV1 is zero; and similarly the mean square values of the voltages Vpp(3) and Vpp(4) respectively detected by the detector electrodes 33 and 34 are equal and accordingly their difference ΔV2 is zero. On the other hand, when the standing wave shown in FIG. 9B is generated in the elastic body 1, while the mean square values of the voltages Vpp(1) and Vpp(2) respectively detected by the detector electrodes 31 and 32 are still equal and their difference ΔV1 is accordingly still zero, by contrast the mean square values of the voltages Vpp(3) and Vpp(4) respectively detected by the detector electrodes 33 and 34 are no longer equal, and accordingly their difference ΔV2 is no longer zero. Accordingly, since the CPU 45 detects the voltages from the four detector electrodes 31 through 34, calculates their mean square values, and obtains the differences ΔV1 and ΔV2 thereof, it is possible for the CPU 45 to conclude that if both of these differences ΔV1 and ΔV2 are zero then only the traveling wave component of FIG. 9A is present in the vibrations being generated in the elastic body 1 while no undesirable standing wave component such as shown in FIG. 9B is present, while by contrast if both ΔV1 and ΔV2 are not zero it is possible to conclude that some standing wave component is present. More exactly, since as explained above the nodes of the standing wave component can actually be positioned at any circumferential positions around the stator assembly ST rather than necessarily being at their positions as shown in FIG. 9B, it is possible, if either of the differences ΔV1 and ΔV2 is non zero, for the CPU 45 to conclude that then some undesirable standing wave component is present in the vibrations being generated in the elastic body 1.

In the shown preferred embodiment of the present invention, the interval in the circumferential direction between the center of the first pair 31 and 32 of the detector electrodes (taken as a group) and the center of the second pair 33 and 34 thereof (also taken as a group) is substantially equal to 3×λ/4. This is done in order to insure that, by keeping this interval smaller than the wavelength of the standing wave, it is possible accurately to detect the presence of the standing wave component in the vibration of the elastic body 1 as explained above, even if the positions of the nodes of the standing wave shift, either over time or between various individual stator assemblies ST. It will readily be understood, based upon the above disclosure, that it would also be acceptable for this interval between the two groups of detector electrodes to be substantially equal to $(n+\frac{3}{4})\times\lambda$, where n is any positive integer.

Figure 10:
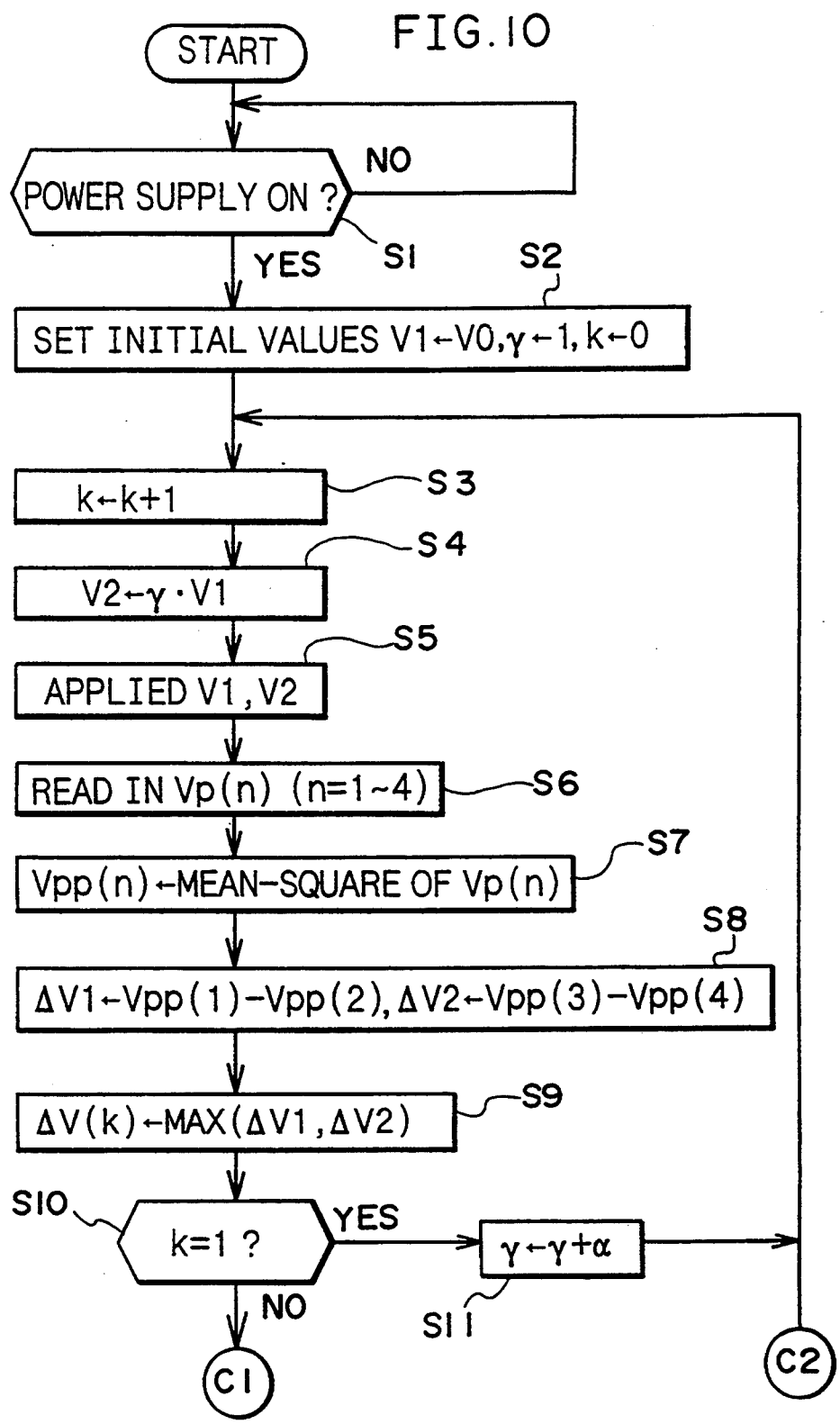
FIG. 10 is a first portion of a flow chart showing the operation of a CPU of the drive circuit for an ultrasonic motor of the present invention shown in FIG. 7.

FIGS. 10 and 11 are the two portions of a flow chart which explain the operation of the CPU 45. The operation of the preferred embodiment of the drive circuit for an ultrasonic motor of the present invention shown in FIG. 7 will now be explained with the aid of these flow charts.

In the step S1, a decision is made as to whether or not the power source for the drive circuit for the ultrasonic motor is turned on, and if the power is on then the flow of control proceeds to the step S2. In the step S2, initialization is performed. In concrete terms, the voltage supplied to the A group of electrodes is changed from V0 to the first high frequency AC voltage V1, the ratio γ between the first and second high frequency AC voltages V1 and V2 supplied to the A and B group of electrodes, respectively, is changed from zero to 1, and the value of a variable k which is used for counting the number of repetitions of the calculation process is set to zero.

In the step S3, the value of the count variable k is incremented by "1", and next in the step S4 the second high frequency AC voltage V2 is set to the current value of the first high frequency AC voltage V1 multiplied by the ratio γ. Next, in the step S5, the amplitude of the vibrations in the stator assembly ST is detected by reading in the value of the voltage on the monitor electrode 35, and a frequency value corresponding to this vibrational amplitude is output to the high frequency signal generator 11. Further, the amplification ratio provided by the amplifiers 42 and 44 is controlled in the same manner. By doing this, the high frequency AC voltages V1 and V2 are supplied to the electrodes 30a and 30b of the piezoelectric element 2 respectively. These voltages excite vibrations in the piezoelectric element 2 which are transmitted to the elastic body 1, and the rotor assembly RO is rotated by the traveling wave component of these vibrations.

In the step S6, the values of the voltages at the electrodes 31 through 34 provided on the under surface of the elastic body 1 are read in several times over a predetermined time interval, and are stored in the variables Vp(1) to Vp(4).

In the step S7, the mean square values Vpp(1) to Vpp(4) of Vp(1) to Vp(4) within the predetermined time period are calculated. In the step S8 the difference $\Delta V1$ between Vpp(1) and Vpp(2), and the difference $\Delta V2$ between Vpp(3) and Vpp(4), are calculated. The standing wave component in the A group of electrodes is detected from the value $\Delta V1$, while the standing wave component in the B group of electrodes is detected from the value $\Delta V2$. In the step S9, the larger of the two values $\Delta V1$ and $\Delta V2$ is stored in the variable $\Delta V(k)$, where k is the counting variable for the number of times around the main loop of this program. By selecting the larger of these two values, it becomes possible accurately to detect the standing wave component of the vibration excited in the elastic body 1, even if the position of the node of the standing wave changes.

In the step S10, a decision is made as to whether the current value of the count variable k which shows the number of times the main loop of this calculation program has been traversed since the power was switched on is unity, i.e. as to whether-or not this is the first repetition of the calculation process. If k is equal to unity, the flow of control passes to the step S11, while otherwise the flow of control passes to the step S12.

In the step S11, the voltage ratio $\gamma$ is increased by a relatively small positive value $\alpha$, so that its new value is now $(\gamma+\alpha)$, and then the flow of control returns to the step S3. The positive value $\alpha$ should be set to a desirable value in consideration of the material from which the piezoelectric element 2 is made, as well as in consideration of the order of magnitude of manufacturing errors to be generally expected, and the like.

In the step S12 (refer now to the FIG. 11 flow chart) the difference Ma between the value $\Delta V(k)$ calculated just previously in the step S9 and the value $\Delta V(k-1)$ thereof calculated during the previous iteration of the main loop of this program is calculated. Next, in the step S13, a decision is made as to whether or not this value Ma is greater than or equal to zero, and if the decision result is YES then the flow of control passes to the step S14, while if the decision result is NO then the flow of control passes to the step S15.

In the step S14, the voltage ratio $\gamma$ is decreased by the positive value $\alpha$, so that its new value is now $(\gamma-\alpha)$, and then the flow of control passes to the step S16. On the other hand, in the step S15, the voltage ratio $\gamma$ is increased by the positive value $\alpha$, so that its new value is now $(\gamma+\alpha)$, and again the flow of control passes to the step S16.

In the step S16, a decision is made as to whether or not the power source is turned off, and if the power is off then processing stops, while if the power is still on the flow of control returns to the step S3, to repeat the above described processing.

In this manner, the CPU 45 performs control so as, if Ma is greater than or equal to zero, to reduce the value of the second high frequency AC voltage V2 (in the step S14), and so as, if Ma is less than zero, to increase the value of the second high frequency AC voltage V2 (in the step S15), whereby in both cases the value of Ma is brought closer towards zero. Further, by repeating this type of hill climbing control, it is possible to reduce towards zero the standing wave component of the vibrations in the elastic body 1 as detected in the step S8.

Figure 6:
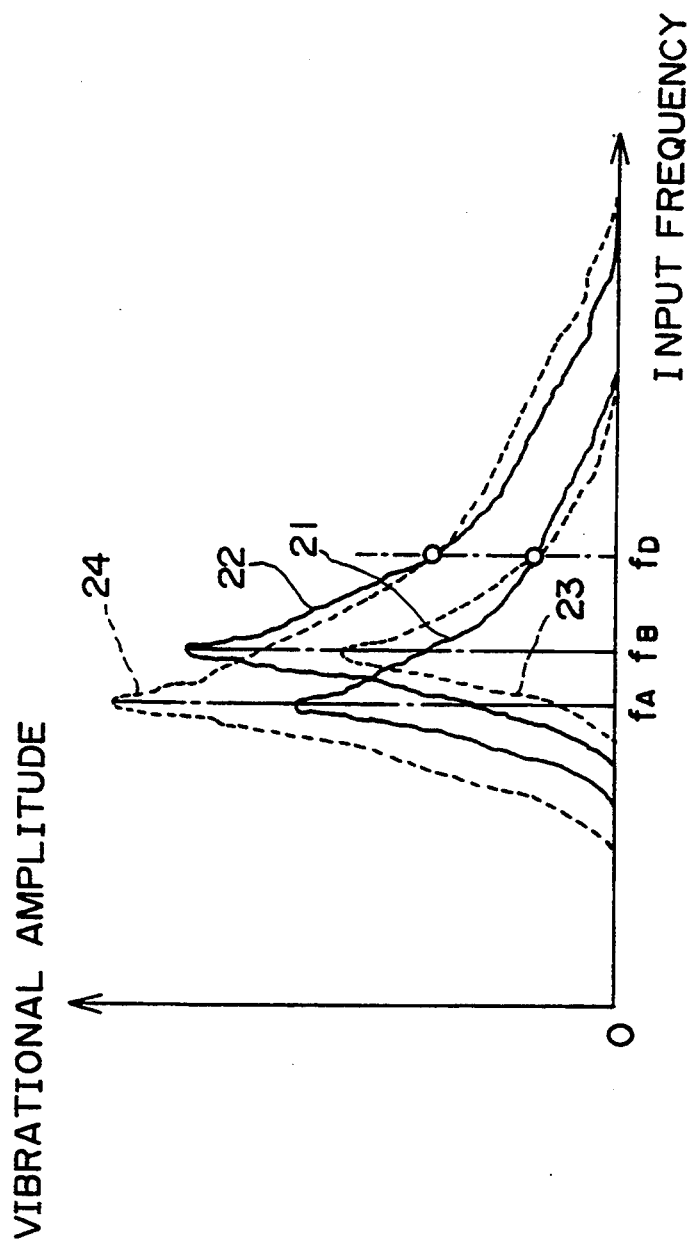
FIG. 6 is a graph showing the relationship between the frequency of the high frequency AC voltage supplied to the electrodes and the vibrational amplitude of the stator member ST.

Accordingly, as shown in FIG. 6, if there is a deviation in the resonant frequency and the vibrational amplitude for the resonance curve 21 when high frequency AC voltage is supplied only to the A group of electrodes and for the resonance curve 22 when high frequency AC voltage is supplied only to the B group of electrodes, then it will be effective to reduce the amplitude of the high frequency AC voltage signal supplied to the B group of electrodes, according to the flow charts of FIGS. 10 and 11. If by doing this the vibrational amplitude at the frequency fD of the resonance curve 23 shown by the dashed line when high frequency AC voltage is supplied only to the B group of electrodes is made equal to the vibrational amplitude of the resonance curve 21, then it is possible to eliminate the standing wave component at this frequency fD. Alternatively, it is also acceptable to increase the amplitude of the high frequency AC voltage signal supplied to the A group of electrodes, as shown by the resonance curve 24 shown by the dashed line. In this case also, if by doing this the vibrational amplitude at the frequency fD of the resonance curve 24 is made equal to the vibrational amplitude of the resonance curve 22, then it is possible to eliminate the standing wave component at this frequency fD.

Although according to the above described flow charts the second high frequency AC voltage V2 was varied according to the value of Ma as calculated in the step S12, it would also be acceptable to vary the value of the first high frequency AC voltage V1. Alternatively, both the first and the second high frequency AC voltages V1 and V2 could be varied. As another alternative, it would also be acceptable, without calculating the value of Ma, to bring the value of $\Delta V(k)$ calculated in the step S9 towards zero by a similar type of hill climbing control process to that described above. Further, the present invention could be applied to a drive circuit for a linear type ultrasonic motor, rather than to a drive circuit for a rotary type ultrasonic motor.

What is claimed is:

1. A drive circuit for an ultrasonic motor having a piezoelectric element, an elastic body within which vibrating waves are generated by vibration of said piezoelectric element, and a movable member which is driven by a traveling wave component of said vibrating waves, the drive circuit comprising:.
    a plurality of vibration detection elements provided on the elastic body, the vibration detection elements generating signals indicative of a vibration of said elastic body; and
    a control circuit that detects a presence of a standing wave component of said vibrating waves generated on the elastic body based upon the signals and eliminates the standing wave component by controlling a high frequency AC voltage supplied to said piezoelectric element.

2. A drive circuit for an ultrasonic motor according to claim 1, wherein:

(a) said plurality of vibration detection elements includes two pairs of vibration detection elements, the vibration detection elements within each pair being spaced apart by an interval of substantially $\lambda/4$, where $\lambda$ is the wavelength of said traveling wave component; and (b) a center of each of said two pairs of vibration detection elements is spaced apart by an interval of substantially $(n+\frac{3}{4})\times\lambda$, where n is a non-negative integer.

3. A drive circuit for an ultrasonic motor according to claim 1, further comprising:

a power supply that supplies a first high frequency AC voltage and a second high frequency AC voltage to said piezoelectric element, wherein said control circuit calculates, for each of said two pairs of vibration detection elements, a difference between mean square values of voltages detected by the two elements of each pair, and controls said power supply so as to adjust a balance between said first high frequency AC voltage and said second high frequency AC voltage so as to reduce said differences of each pair.

4. A drive circuit for an ultrasonic motor according to claim 3, wherein said control circuit substantially equalizes a first difference, the first difference being a larger of said two differences calculated for said two pairs of vibration detection elements at a first time, and a second difference, the second difference being a larger of said two differences calculated for said two pairs of vibration detection elements at a second time later than the first time after having altered at least one of said first high frequency AC voltage and said second high frequency AC voltage.

5. A drive circuit for an ultrasonic motor according to claim 4, wherein said control circuit controls said second high frequency AC voltage to be equal to said first high frequency AC voltage multiplied by $(\gamma+\alpha)$, where $\gamma$ is a standard ratio of a current value of said second high frequency AC voltage to said first high frequency AC voltage and $\alpha$ is a positive fixed value, if said second difference is smaller than said first difference.

6. A drive circuit for an ultrasonic motor according to claim 4, wherein said control circuit controls said second high frequency AC voltage to be equal to said first high frequency AC voltage multiplied by $(\gamma-\alpha)$ if said second difference is greater than said first difference, where $\gamma$ is a standard ratio of a current value of said second high frequency AC voltage to said first high frequency AC voltage and a is a positive fixed value.

7. A drive circuit for an ultrasonic motor having a piezoelectric element, an elastic body within which vibrating waves are generated by vibration of said piezoelectric element, and a movable member which is driven by a traveling wave component of said vibrating waves, comprising:

two pairs of vibration detection elements, the vibration detection elements generating signals indicative of a vibration of said elastic body, the vibration detection elements within each pair of vibration detection elements being spaced apart by an interval of substantially $\lambda/4$, where $\lambda$ is the wavelength of said traveling wave component, and a center of each of said two pairs of vibration detection elements being spaced apart by an interval of substantially $(n+\frac{3}{4})\times\lambda$, where n is a non-negative integer; and a control circuit which controls a high frequency AC voltage supplied to said piezoelectric element based upon the signals.

8. A drive circuit for an ultrasonic motor according to claim 7, further comprising a power supply that supplies a first high frequency AC voltage and a second high frequency AC voltage to said piezoelectric element, wherein, said control circuit calculates, for each of said two pairs of vibration detection elements, a difference between mean square values of voltages detected by the two elements of each pair, and controls said power supply so as to adjust a balance between said first high frequency AC voltage and said second high frequency AC voltage so as to reduce said difference of each pair.

9. A drive circuit for an ultrasonic motor according to claim 8, wherein said control circuit substantially equalizes a first difference and a second difference, the first difference being a larger of said two differences calculated for said two pairs at a first time, the second difference being a larger of said two differences calculated for said two pairs at a second time later than the first time after having altered at least one of said first high frequency AC voltage and said second high frequency AC voltage.

10. A method of driving an ultrasonic motor having a piezoelectric element, an elastic body within which waves are generated by vibration of said piezoelectric element, and a movable member which is driven by a traveling wave component of said vibrating waves, comprising the steps of:

detecting vibrations of said elastic body with a plurality of vibration detection elements provided on said elastic body, the vibration detection elements generating signals indicative of the vibrations;

detecting a standing wave component of said vibrating waves based upon the signals; and eliminating the standing wave component of said vibrating waves by controlling a high frequency AC voltage supplied to said piezoelectric element.

11. A method of driving an ultrasonic motor according to claim 10, wherein said plurality of vibration detection elements are comprised of two pairs of vibration detection elements, the vibration detection elements within each pair of vibration detection elements being spaced apart by an interval of substantially $(n+\frac{3}{4})\times\lambda$, where $\lambda$ is a wavelength of said traveling wave component and n is a non-negative integer.

* * * * *